United States Patent
Hollingshead

[19]

[11] Patent Number: 6,085,783
[45] Date of Patent: Jul. 11, 2000

[54] UNIFIED MODULAR MULTI-DIRECTIONAL FLOW CHEMICAL DISTRIBUTION BLOCK

[76] Inventor: J. Gregory Hollingshead, 1304 Verdant Way, Austin, Tex. 78746

[21] Appl. No.: 09/145,716

[22] Filed: Sep. 2, 1998

[51] Int. Cl.⁷ ..................................................... F16K 11/00
[52] U.S. Cl. ............................................ 137/597; 137/884
[58] Field of Search ...................................... 137/884, 597

[56] References Cited

U.S. PATENT DOCUMENTS

| | | |
|---|---|---|
| 3,215,158 | 11/1965 | Bass et al. . |
| 3,407,834 | 10/1968 | Brandenberg . |
| 3,457,943 | 7/1969 | Kawabata . |
| 3,504,704 | 4/1970 | Beckett et al. .......................... 137/269 |
| 3,654,960 | 4/1972 | Kiernan . |
| 3,915,194 | 10/1975 | Friedrich ................................ 137/884 |
| 4,082,324 | 4/1978 | Obrecht . |
| 4,224,957 | 9/1980 | Darves et al. . |
| 4,392,677 | 7/1983 | Hardouin . |
| 4,415,004 | 11/1983 | Bouteille et al. . |
| 4,921,072 | 5/1990 | Divisi .................................. 137/884 X |
| 5,488,925 | 2/1996 | Kumada . |
| 5,529,088 | 6/1996 | Asou . |
| 5,662,143 | 9/1997 | Caughran . |
| 5,769,110 | 6/1998 | Ohmi et al. . |
| 5,836,355 | 11/1998 | Markulec et al. . |
| 5,860,445 | 1/1999 | Yoshimura et al. . |
| 5,860,676 | 1/1999 | Brzezicki et al. . |

OTHER PUBLICATIONS

Semi Draft Doc. 2787 "Specification For Surface Mount Interface of Gas Distribution Components," before Jun. 1998, 1 page.

Semi Draft Doc. 2787.1 "Specification For Surface Mount Interface of Gas Distribution Components–Counterbore Design," before Jun. 1998, 2 pages.

*Primary Examiner*—Kevin Shaver
*Assistant Examiner*—John Bastianelli
*Attorney, Agent, or Firm*—Conley, Rose & Tayon, P.C.; Robert C. Kowert

[57] ABSTRACT

Modular chemical delivery substrate blocks which have both directional and transverse flow direction capabilities united in a single modular substrate block and which utilize localized fastener substrate joining techniques unique to such a design. The design, which incorporates current semiconductor industry standards (such as SEMI 2787.1), dictates specific mechanical dimensional constraints and bolt joining localities that are also presented herein. Likewise, the mechanical features and constraints specific to attaching other direct chemical process flow substrate blocks to such unified multidirectional flow blocks are described. Use of this united multi-flow block design results in fewer seals and fasteners required to provide multi-directional flow regimes, reduces the total chemical wetted volume of the chemical delivery streams, minimizes modular chemical delivery system stacking height, and reduces system weight.

50 Claims, 6 Drawing Sheets

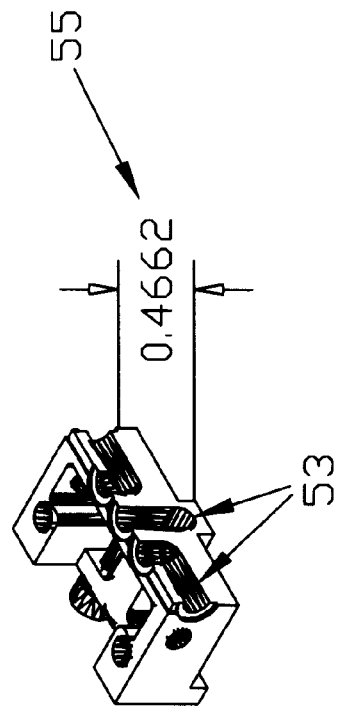
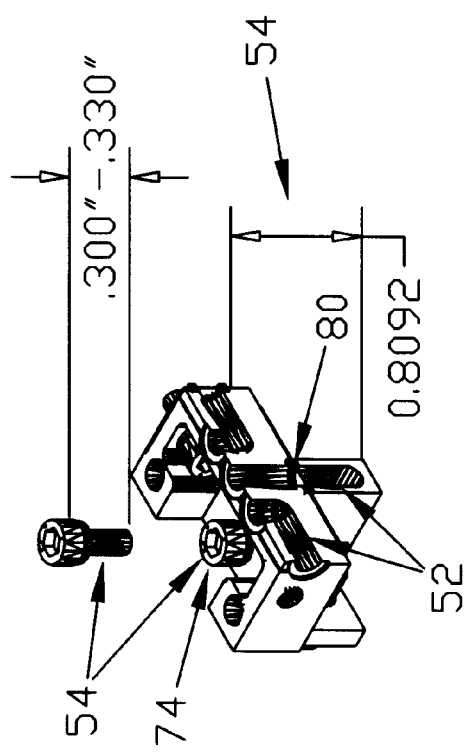
Fig. 3B
Fig. 3A

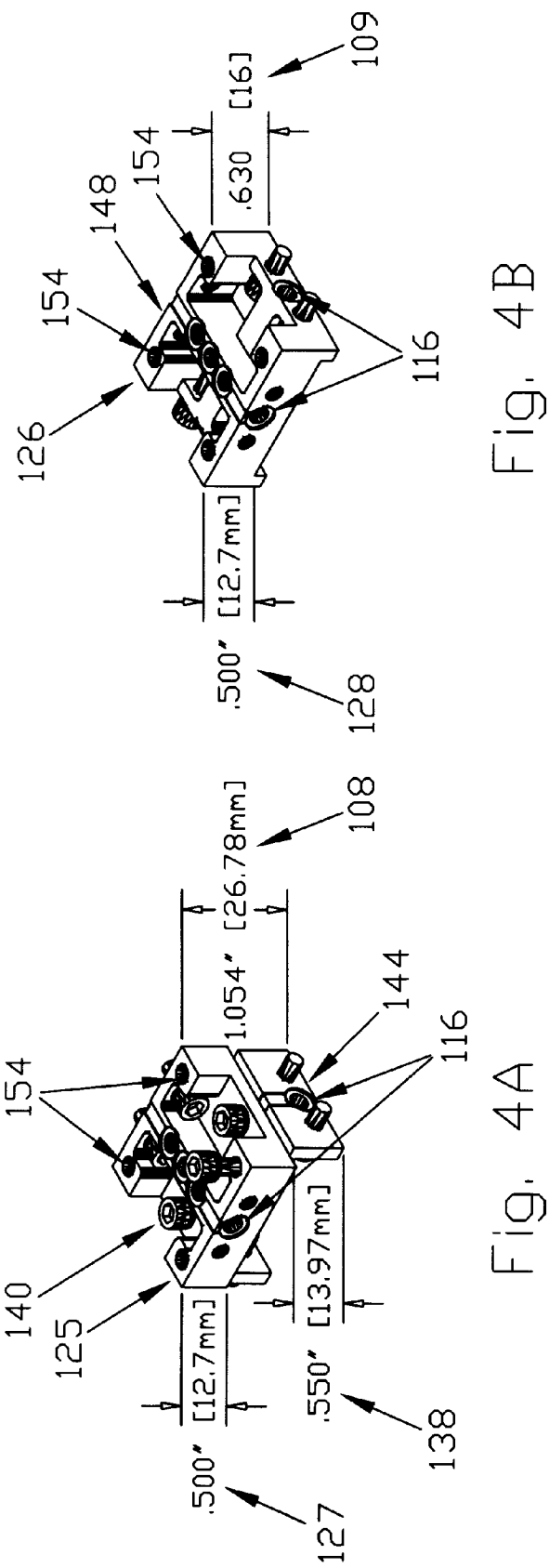

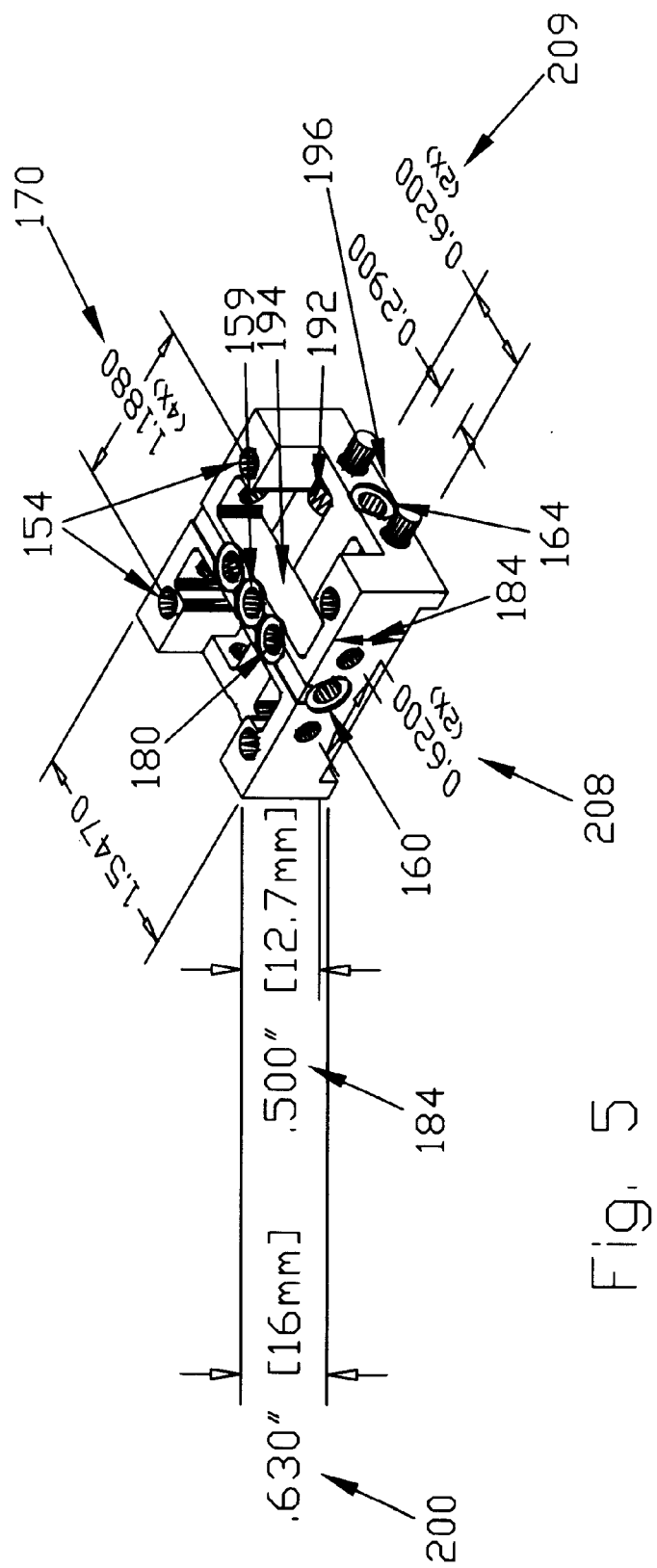

UNIFIED MODULAR MULTI-DIRECTIONAL FLOW CHEMICAL DISTRIBUTION BLOCK

FIELD OF THE INVENTION

This invention pertains to semiconductor modular chemical distribution substrate block design and, more particularly, to the "unified" multi-directional flow (direct and transverse flows in combination) in a single substrate block, the specific mechanical dimension requirements of such a substrate unified multi-directional flow block design, and subsequent mechanical features of mating single directional flow blocks to such a unified multi-directional flow block design.

BACKGROUND OF THE INVENTION

In the semiconductor industry as well as in other industries, there is need for "united" or combined flow regimes in a single modular chemical delivery substrate block. For example, as shown in FIGS. 1A, 2A, 3A and 4A, some designs for modular chemical delivery blocks (4,8) have typically achieved process chemical flows for both directional flow along line (6) (south to north, or north to south when viewed from the top) and transverse flow along line (14) (east to west, or west to east when viewed from the top) by combining a top layer block (4) to provide directional process flow (6) with a bottom layer block (8) to provide a transverse directional process flow (14). As shown in FIGS. 1A and 2A, this is typically accomplished by using fasteners (12) (usually threaded bolts and/or nuts) to attach the multiple layer blocks (4,8) together. Although this prior art multi-block multi-layer approach satisfies the requirement for having both directional and transverse process (and/or purge) chemical flows, several limitations to utilizing modular chemical delivery substrates result.

First, in a multi-block multi-layer design, the center height (18) measured from the top of the process stream line (20) to the bottom of the block assembly (24) is effectively much higher than that in a design using a single block (28) of the present invention as shown in FIG. 1B which can provide the same chemical flow regimes. Because each chemical flow direction is achieved with two or more individual blocks (4,8) for multi-layer substrate block assemblies, the typical total stacking height (32) of 1.054" (26.8 mm) increases linearly in proportion to the substrate thicknesses of each block in a dual stack design. This contributes to both excessive system weight and the total height of the resulting system. Secondly, when compared to a single block design, prior art multi-block multi-layer modular chemical delivery systems on average have a higher mass of material (usually machined or cast from stainless steel) and thus tend to be heavy and bulky in a completed modular system assembly. For many applications, excess system size and weight present extreme disadvantages for the user who wishes to use traditional modular chemical substrate delivery systems.

Multi-layer blocks that are stacked together via a fastened interface also require at least one additional seal (36) per layer and additional fasteners (40) in order to provide a leak-proof system for potentially corrosive or hazardous chemical transport through the system. Although prior art multi-layer block designs provide directional and transverse chemical flow regimes, the additional joining fasteners (40) and seals (36) required also increases total costs. Therefore, modular chemical delivery blocks which can provide both directional and transverse chemical flows independently and which are integrated into a single substrate block design with united flows are desired and needed.

Furthermore, as shown in FIGS. 3A and 3B, multi-layer stacked blocks having multi-directional flow capabilities increase the total chemical wetted volume of the bore (52) inside each substrate assembly system as compared to the bore (53) in the unified design of the present invention. This increase can reduce the dry down times when an inert gas carrier is used to dry out the moisture content of the chemical system. Per the industry standard SEMI 2787.1, the internal diameter of both bores (52,53) must be a minimum of 0.18" (4.57 mm). Thus the volume (V) of wetted area $V = A \times L$ (where $A = \Pi D^2/4$ and L=length of wetted bore) increases with the stacking heights and corresponding increase in the length of the bore. In FIG. 3A, the length L of the bore (54) for a multi-layer assembly is almost twice that of the unified single layer block bore length (55) shown in FIG. 3B. Clearly, a method and system for providing multiple flow regimes (directional and/or transverse flow) in a single, united chemical distribution block overcomes many disadvantages of the prior art. Additionally, certain mechanical features and constraints specific to this design are presented for achieving such a multidirectional flow in a unified block substrate.

SUMMARY OF THE INVENTION

Modular chemical delivery substrate blocks which have both directional and transverse flow direction capabilities united in a single modular substrate block and which utilize localized fastener substrate joining techniques unique to such a design are described. The design, which incorporates current semiconductor industry standards (such as SEMI 2787.1), dictates specific mechanical dimensional constraints and bolt joining localities. Use of this united multi-flow block technique results in fewer seals and fasteners required to provide multi-directional flow regimes, reduces the total chemical wetted volume of the chemical delivery streams, minimizes modular chemical delivery system stacking height, and reduces system weight. The mechanical features and constraints specific to accomplishing such a unified multi-directional chemical distribution substrate block design are also presented herein. Likewise, the mechanical features and constraints specific to attaching other direct chemical process flow substrate blocks to such unified multi-directional flow blocks are described. Additional objects and advantages of the invention will also become apparent from a consideration of the drawings and ensuing description.

BRIEF DESCRIPTION OF THE DRAWINGS

FIG. 3A is a cutaway cross-sectional view of a prior art multi-layer block assembly system.

FIG. 3B is a cutaway cross-sectional view of a unified multi-directional flow assembly of the present invention.

FIG. 4A is a perspective view of a multi-layer block assembly with both directional and transverse directional flow regimes.

FIG. 4B is a perspective view of a unified multi-directional flow regime assembly which depicts the potential stacking height and weight reduction achieved by utilizing the design of the present invention.

FIG. 5 is a perspective view of a unified multi-directional chemical delivery block of the present invention depicting certain mechanical constraints of the design.

DETAILED DESCRIPTION OF THE PREFERRED EMBODIMENT

Figure 1B:
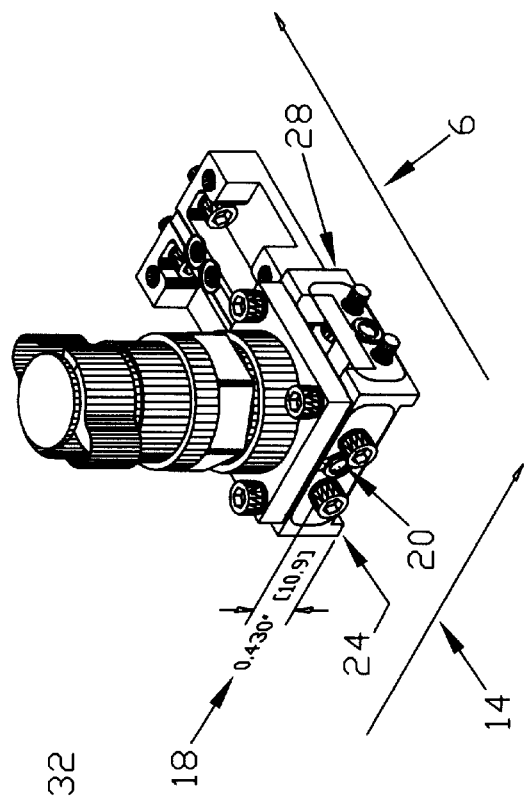
FIG. 1B is a perspective view of a unified multi-directional chemical delivery block assembly of the present invention.
Figure 1A:
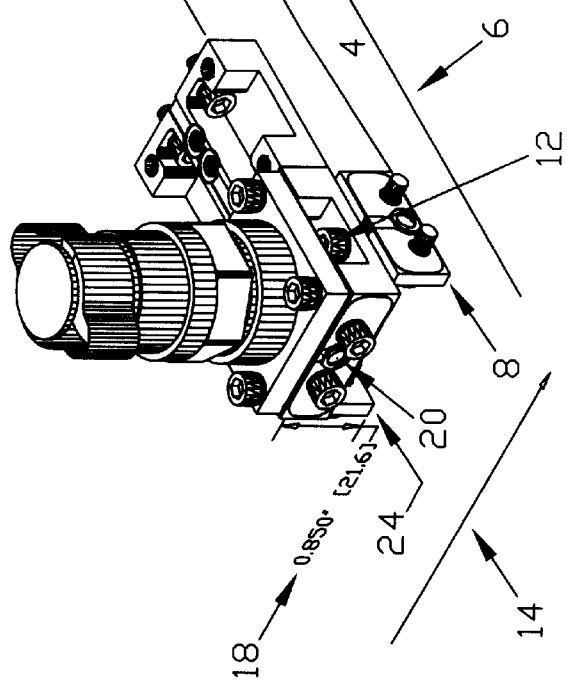
FIG. 1A is a perspective view of a multi-layer multi-directional chemical delivery block assembly.
Figure 2B:
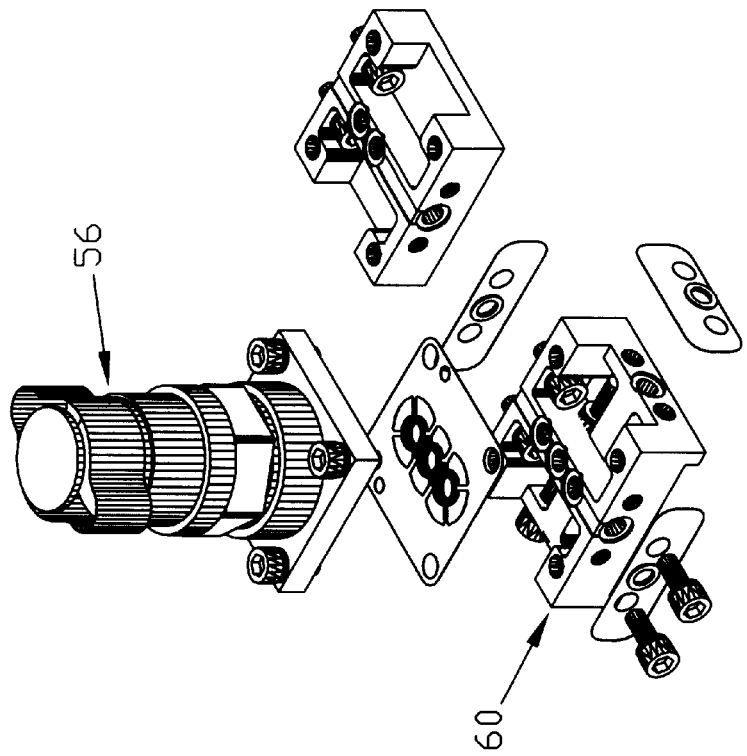
FIG. 2B is an exploded perspective view of the unified block assembly of the present invention.
Figure 2A:
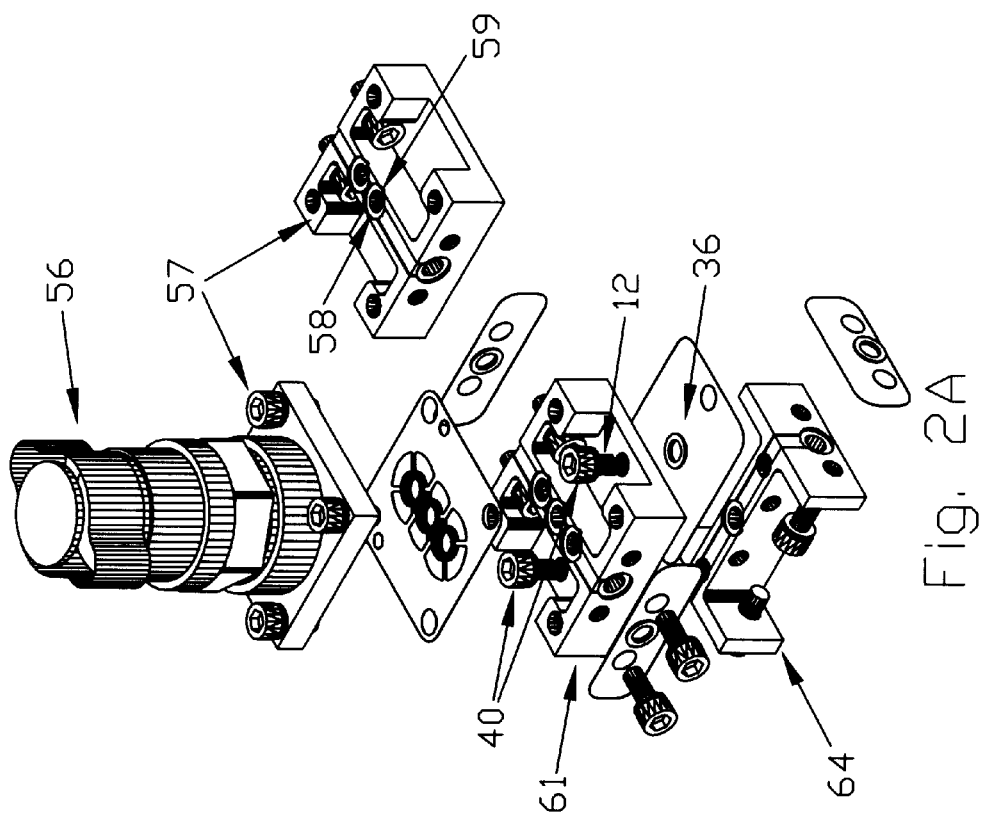
FIG. 2A is an exploded perspective view of the prior art block assembly shown in FIG. 1A.

SEMI standard 2787.1 sets forth the industry standard for the mechanical interface for modular chemical delivery surface mount components. Referring to FIGS. 2A and 2B, such chemical delivery surface mount controls (56) attach directly to the top block (61) of a modular chemical delivery substrate and control the flow of chemicals to the desired destination. SEMI standard 2787.1 dictates the top mechanical chemical gas delivery mounting hole locations (57) (four holes each at 1.188" centers), the gas path bore centerline locations (58), and the gas seal porting locations (59). Based on these industry standard requirements and dictated procedures, the following method and apparatus to provide multi-directional chemical flow, both direct and transverse directional flows, in a single unified substrate block shall be described herein.

Providing multi-directional flow in a unified substrate block requires several mechanical features and flow path constraints when conforming to SEMI 2787.1 standards. FIG. 2A depicts a multi-layer modular substrate block assembly whereby the top block (61) (responsible for the direct flow process stream) is attached via intermediate (top to bottom) fasteners (40) and one or more intermediate seals (36) to a lower layer block (64) (commonly referred to as a manifold layer, header, or transverse directional flow). The lower layer block (64), when combined with other lower layer blocks, provides the user a greater number of common chemical delivery process streams due to its ability to supply chemical flow in a direction perpendicular to that provided by the top block (61). Referring to FIG. 2B, a unified multi-directional flow substrate block (60) can be used to provide the same flow regimes as the previously described multi-layer substrate assembly while eliminating the need for intermediate fasteners (40) and intermediate seals (36) required by the multi-layer assembly technique of FIG. 2A. This is accomplished by machining the required multi-directional flow regimes into a single substrate block with the specific dimensions as further described herein.

FIGS. 3A and 3B illustrate the realized reduction in chemical delivery flow path length and corresponding wetted volume between the typical multi-layer substrate assembly shown in FIG. 3A and a unified substrate block assembly of the present invention shown in FIG. 3B. Because multi-layer substrate assemblies require additional intermediate fastener hardware (74) and intermediate seals (80) to mate the two layers together, the proper fastener clearances (75) (typically 0.300" to 0.330" with two to four each per assembly) for the top surface blocks to mate to a lower layer block require additional depth to the flow paths. This increases the total wetted flow path (54) and the corresponding flow path volume of the prior art system. With a unified substrate block assembly design of the present invention, however, the multiple layer fastener hardware (74) and associated sealing methodology (80) is eliminated, thus dramatically reducing the length (55) of wetted chemical delivery flow paths in the vertical flow directions.

FIG. 4A is a perspective view of a multi-layer block assembly (140) with both directional and transverse directional flow regimes. FIG. 4B shows the unified multidirectional flow regime assembly (148) of the present invention. A comparison of FIG. 4A with FIG. 4B illustrates the difference in the potential stacking height (108) of a multi-layer substrate assembly (140) and a unified multi-directional chemical distribution substrate block regime (148) with lower stacking height (109). Since the weight of these assemblies (140,148) is in direct proportion to the sum total mass of their respective components, any reduction in mass such as that achieved in the unified multi-directional flow substrate block (148) will likewise reduce the total weight of the given system assembly in which the unified block (148) is used.

Because both the multi-layer multi-directional flow assembly (140) and the unified multi-directional flow assembly (148) must provide top and lower level axial seal locations (116) to mate one block to another block in a full system assembly, each block must have a minimum depth to provide proper screw clearances for the top layer blocks in order to accommodate the fastener locations (154) and depths for mounting surface mount components as required by SEMI 2787.1. This minimal depth is typically 0.3" to 0.33" and must exist at four fastener locations (154) on each block. Likewise, the blocks must have a minimum depth to provide enough surface area to the top axial seal locations (125,126) without violating industry compliance standards for minimal wall thickness of the flow paths per ASTM specifications A-269, A-270, and A-632 (0.035" wall thickness) as applicable. Based on a minimal top block depth (127) of 0.5", it becomes evident that the same constraints would hold true in calculating the lower layer block depths (138) of 0.55".

In summary, in order to provide multi-directional flow regimes in a multiple stack configuration, the total stacking height (108) of a multi-directional, multi-layer system (140) must be increased substantially over the height (109) required for a unified multidirectional flow design. Utilizing a unified multi-directional flow substrate block (148) eliminates the need for a secondary layer (144) to provide transverse flow, and thus the total stacking height (109) of the unified multi-directional flow substrate block (148) is reduced significantly. Since most modular chemical delivery substrate blocks are machined out of high purity stainless steel materials, a completely assembled modular chemical delivery system's weight is dependent upon the total mass weight of the blocks making up the assembly. The elimination of a secondary layer in a multiple layer, multidirectional modular chemical delivery system through utilization of a unified multidirectional flow block configuration can significantly reduce the overall weight of the system.

In accordance with SEMI 2787.1, and referring to FIG. 5, it is clear that no mechanical interference with regard to the placement of the fastener locations (154) and seal cavity areas (180) is permitted. Additionally, as shown in FIG. 5, four surface mount component fastener locations (154) are required with typical mechanically threaded (tapped) hole depths at no less than 0.30"–0.33" for safety reasons (so as not to over-travel the fasteners into the block). Likewise, because SEMI 2787.1 constrains the length and width of the modular substrate blocks to a maximum of 1.547" (39.3 mm), the following mechanical features for providing multi-directional chemical flow regimes in the unified singular block configuration of the present invention can be realized. Specifically, SEMI Standard 2787.1 requires a 0.29" (7.36 mm) sealing interface diameter (159) on the top surface of all such substrate designs. Likewise, the unified multi-directional flow block design described herein utilizes the same 0.29" (7.36 mm) sealing interface for the top layer axial connection (160) and the lower axial sealing pin (164).

FIG. 5 illustrates the design of the present invention that results from complying with SEMI 2787.1. In particular, the depth of the block permits machining of four top surface mount component fastener holes (154) having depths of 0.30" to 0.33" at 1.188" (top surface) centers (170) while allowing for a 0.29" (7.36 mm) sealing interface for the top axial connection (160) and maintaining safe chemical path wall thickness per ASTM specifications A-269, A-270, and A-632. The minimum mechanical interface depth (184) of the top axial connection (160) is 0.5" (12.7 mm). In order to also maintain safe chemical path wall thickness per ASTM specifications, to provide a minimal depth of 0.305" (7.747 mm) to accommodate lower axial (transverse axial) fasteners (192) from the bottom of the block to the bottom wall thickness of the top directional chemical flow path (194), while still allowing for a 0.29" (7.36 mm) sealing interface for the lower axial (transverse axial) connection (196), a total minimum depth (200) of 0.63" (16 mm) from the bottom of the transverse side of the unified multi-directional chemical flow block to the top of the unified multi-directional chemical flow block is required. Because both the top axial seal and lower axial (transverse axial) connection (60,164) require a 0.29" (7.36 mm) sealing diameter interface, while maintaining a 0.18" (4.572 mm) chemical wetted bore internal diameter (196) and a safe chemical path wall thickness per ASTM specifications, the minimum center-to-center spacing (208) of the axial fastener locations is 0.62" (15.748 mm) for the top axial connections, and the minimum center-to-center spacing (209) is 0.62" (15.748 mm) for t he bottom axial connections.

Figure 6:
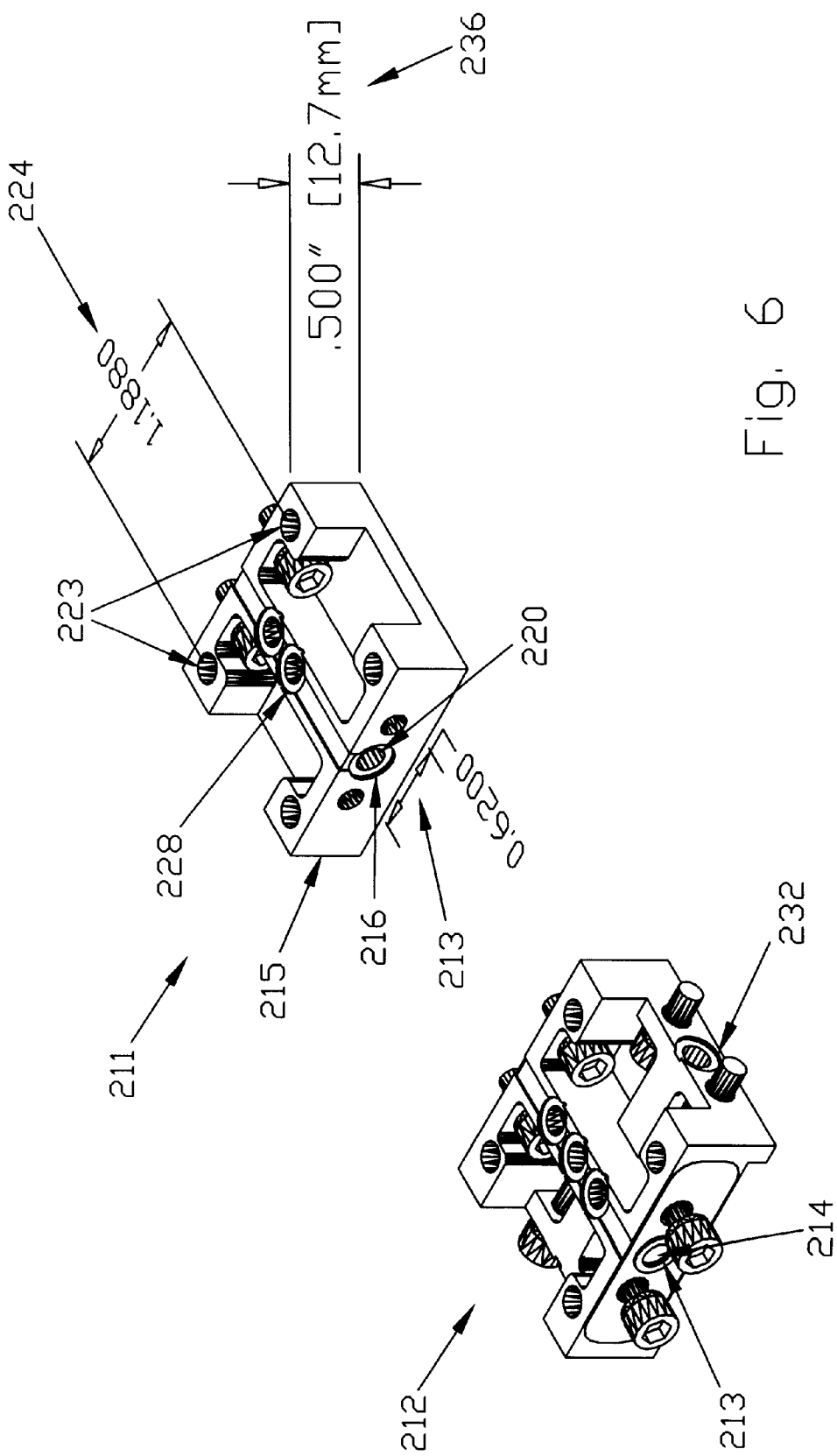
FIG. 6 is a perspective view of a single directional chemical delivery flow block capable of being attached to a multi-directional unified chemical delivery block of the present invention.

Referring now to FIG. 6, the interface between a typical single directional chemical flow substrate block (211) and a unified multi-directional chemical flow substrate block (212) is described along with the associated mechanical features of such a block (211). FIG. 6 depicts a typical direct (singular) chemical flow path block substrate (211) which must mate at the top axial connection locations with a unified multi-directional chemical flow substrate block (212). First, it should be pointed out that the unified multi-directional flow block design described herein utilizes the same 0.29" (7.36 mm) sealing interface (213) with a 0.18" diameter wetted chemical path bore (214) for t he top axial connection to properly connect to the top axial singular (direct flow) connection (215). The design also uses the corresponding 0.29" (7.36 mm) sealing interfaces (216) and 0.18" diameter wetted chemical path bores (220) for the singular (direct) chemical flow path block substrates (211). As stated previously, SEMI 2787.1 requirements for a typical singular or multiple chemical flow rate block should maintain a block depth which can accept the 0.30"–0.33" four top surface mount component fastener holes (223) at 1.188" (top surface) centers (224), allow for a 0.29" (7.36 mm) sealing interface for the top sealing interface connections (228), and maintain safe chemical path wall thickness (232) per ASTM specifications. Thus, another mechanical requirement for mating singular chemical flow path blocks to either another singular chemical flow path block or a multidirectional unified chemical flow path block is a minimum mechanical interface depth (236) for the top axial mating interface of at least 0.5" (12.7 mm). As stated previously in conjunction with the description of the unified multi-directional chemical flow path block (212), because both the top axial seal (label) and lower axial (transverse axial) connection interfaces (label) require a 0.29" (7.36 mm) sealing diameter interface, while maintaining the 0.18" (4.572 mm) chemical wetted bore internal diameter and the safe chemical path wall thickness per ASTM specifications, the minimum center-to-center spacing of the top axial fastener locations are 0.62" (15.748 mm) for the singular (direct) flow mating substrate blocks (211). By adhering to the dimensions set out above, a single directional flow substrate block (211) can be properly mated with a unified block (212) of the present invention.

While this invention has been described with an emphasis upon certain preferred embodiments, variations in the preferred method and apparatus may be used and the embodiments may be practiced otherwise than as specifically described herein. Accordingly, the invention as defined by the following claims includes all modifications encompassed within the spirit and scope thereof.

What is claimed is:

1. A semiconductor modular chemical distribution system, comprising:
   a first unified modular block;
   a second unified modular block laterally adjacent to said first unified modular block, wherein said first unified modular block is fastened to said second unified modular block along a first axis by a fastener oriented in the direction of said first axis; and
   a third unified modular block laterally adjacent to said first unified modular block,
   wherein said first unified modular block is fastened to said third unified modular block along a second axis horizontally transverse to said first axis by a fastener oriented in the direction of said second axis;
   wherein each of said first, second and third unified modular blocks comprises:
      a first chemical flow path within said each unified modular block, wherein said first chemical flow path extends from a first side of said each unified modular block in a first direction along said first axis and is configured to provide chemical delivery in said first direction; and
      a second chemical flow path within said each unified modular block, wherein said second chemical flow path extends from a second side of said each unified modular block in a second direction along said second axis horizontally transverse to said first axis and is configured to provide chemical delivery in said second direction, and wherein said first chemical flow path is located above said second chemical flow path within said each unified modular block.

2. The system as recited in claim 1, wherein said each unified modular block further comprises:
   a first axial borehole to said first chemical flow path, wherein said first axial borehole is located on said first side of said each unified modular block;
   a first axial sealing interface around said first axial borehole; and
   a pair of first axial fastener locations arranged in said first side on opposite sides of said first axial borehole, and wherein said first unified modular block is fastened to said second unified modular block by fasteners arranged at least partially within said pair of first axial fastener locations of said first unified modular block and said pair of first axial fastener locations of said second unified modular block.

3. The system as recited in claim 2, further comprising:
   a single direction flow chemical delivery block interfaced to said first unified modular block and configured to provide chemical flow only in said first direction; and wherein said unified first modular block further comprises an interface to said single direction flow chemical delivery block in a third side of said first unified modular block opposite said first side, wherein said interface comprises:

a third axial bore hole located on said third side of said unified modular block;

a third axial sealing interface around said third axial bore hole; and third axial fastener locations arranged in said third side for mating said first unified modular block to said single direction flow delivery block.

4. The system as recited in claim 2, further comprising a plurality of chemical delivery control components mounted upon a top surface of said each unified modular block, wherein said each unified modular bock further comprises:

mounting holes in said top surface for mounting a respective one of said plurality of chemical delivery control components;

a first top bore hole to said first chemical flow path, wherein said first top bore hole is located on said top surface of said each unified modular block;

a second top bore hole to said second chemical flow path, wherein said second top bore hole is located on said top surface of said each unified modular block adjacent to said first top borehole; and first and second top seal locations around said first and second top bore holes, respectively.

5. The system as recited in claim 4, wherein said each unified modular block further comprises:

a second axial bore hole to said second chemical flow path, wherein said second axial bore hole is located on said second side of said each unified modular block;

a second axial sealing interface around said second axial bore hole; and a pair of second axial fastener locations arranged in said second side on opposite sides of said second axial borehole, and wherein said first unified modular block is fastened to said third unified modular block by fasteners arranged at least partially within said pair of second axial fastener locations of said first unified modular block and said pair of second axial fastener locations of said third unified modular block.

6. The system as recited in claim 5, wherein said first and second top bore holes and said first and second axial bore holes have the same bore diameter, and wherein said top seal locations and said axial sealing interface have the same seal interface diameter.

7. The system as recited in claim 6, where in said first and second top bore holes and said first and second axial bore holes all have the same bore diameter, and wherein said top seal locations, said first axial sealing interface, and said second axial sealing interface all have the same seal interface diameter.

8. The system as recited in claim 7, wherein said bore diameter is 0.18 inches and wherein said seal interface diameter is 0.29 inches.

9. The system as recited in claim 8, wherein the total top-to-bottom depth of said second side is 0.63 inches.

10. The system as recited in claim 9, wherein said mounting holes in said top surface are located at a 1.188 inch center-to-center spacing, and wherein said pair of first axial fastener locations and said pair of second axial fastener locations are located at a 0.62 inch center-to-center spacing respectively.

11. The system as recited in claim 9, wherein said top surface of said first unified modular block comprises a length and a width of at most 1.547 inches.

12. The system as recited in claim 9, wherein said mounting hole in said top surface have depths of 0.30 to 0.33 inches.

13. The system as recited in claim 1, wherein said second direction is perpendicular to said first direction.

14. The system as recited in claim 1, wherein said each unified modular block is configured to couple said first chemical flow path to said second chemical flow path without use of intermediate fasteners or seals.

15. The system as recited in claim 1, wherein said each unified modular block comprises stainless steel.

16. The system as recited in claim 1, wherein said each unified modular block further comprises a top surface configured to have a chemical control component mounted thereon, and wherein said first and second sides are adjacent to each other at a first corner and transverse to said top surface.

17. The system as recited in claim 16, wherein said first chemical flow path comprises a first side axial borehole in said first side and a first top axial borehole in said top surface, and wherein said first chemical flow path comprises a second side axial borehole in said second side and a second top axial borehole in said top surface, and wherein said first and second top axial boreholes are adjacent.

18. The system as recited in claim 1, wherein said each unified modular block is a single, contiguous modular block.

19. A unified modular block providing multi-directional flow chemical delivery, said unified modular block comprising:

a first chemical flow path within said unified modular block, wherein said first chemical flow path extends from a first side of said unified modular block in a first direction along a first axis and is configured to provide chemical delivery in said first direction;

a second chemical flow path within said unified modular block, wherein said second chemical flow path extends from a second side of said unified modular block in a second direction along a second axis horizontally transverse to said first axis and is configured to provide chemical delivery in said second direction along said second axis, and wherein said first chemical flow path is located above said second chemical flow path within said unified modular block; and a first axial fastener location and a second axial fastener location arranged in said first and second sides, respectively, for mating said unified modular block to laterally adjacent modular blocks, wherein said unified modular block is configured to be fastened to laterally adjacent modular blocks along both said first and second axes by fasteners oriented in the direction of said first axis and said second axis, respectively, and wherein said modular block is configured to be fastened to a laterally adjacent modular block along said first axis by a fastener inserted into said first axial fastener location from an interior of said unified modular block.

20. The unified modular block of claim 19, wherein said first side comprises an exterior surface and an interior surface, and wherein said first axial fastener location comprises a first exterior opening and a first interior opening defined in said first side exterior and interior surfaces, respectively, said unified modular block being further configured to be fastened to a laterally adjacent modular block along said first axis by a fastener inserted into said first interior opening of said first axial fastener location.

21. The unified modular block of claim 20, and wherein said unified modular block is further configured such that when the fastener is fully inserted through said first axial fastener location, a head of the fastener is adjacent said first side interior surface.

22. The unified modular block of claim 21, wherein said unified modular block is further configured such that when the fastener is fully inserted through said first axial fastener location, a shank of the fastener extends through said first axial fastener location and out said first exterior opening of said first axial fastener location.

23. The unified modular block of claim 19, wherein said unified modular block is configured to be fastened to the laterally adjacent modular block with a fastener having a length less than a length of said unified modular block.

24. The unified modular block of claim 19, wherein said unified modular block further comprises:
   a first axial borehole to said first chemical flow path, wherein said first axial bore hole is located on said first side of said unified modular block;
   a first axial sealing interface around said bore hole; and
   a pair of first axial fastener locations arranged in said first side on opposite sides of said first axial borehole, wherein one of said pair of first axial fastener locations is said first axial fastener location, and wherein said unified modular block is configured to be fastened to said laterally adjacent unified modular block by fasteners arranged at least partially within said pair of first axial fastener locations of said first modular block and a respective pair of axial fastener locations of the laterally adjacent modular block.

25. The unified modular block of claim 24, further comprising an interface to a chemical delivery control component on a top surface of said unified modular block, wherein said unified modular block further comprises:
   mounting holes in said top surface for mounting the chemical delivery control component;
   a first top borehole to said first chemical flow path, wherein said first top bore hole is located on said top surface of said unified modular block;
   a second top borehole to said second chemical flow path, wherein said first top bore hole is located on said top surface of said unified modular block, and wherein said second top borehole is adjacent to said first top borehole; and
   first and second top seal locations around said first and second top bore holes, respectively.

26. The unified modular block of claim 25, wherein said unified modular block further comprises:
   a second axial bore hole to said second chemical flow path, wherein said bore hole is located on said second side of said unified modular block;
   a second axial sealing interface around said second bore hole; and
   a pair of second axial fastener locations arranged in said second side on opposite sides of said second axial borehole, wherein one of said pair of second axial fastener locations is said second axial fastener location, and wherein said unified modular block is configured to be fastened to a second laterally adjacent modular block by fasteners arranged at least partially within said pair of second axial fastener locations of said first modular block and a respective pair of axial fastener locations of the second laterally adjacent modular block.

27. The unified modular block of claim 26, wherein said first and second top bore holes and said first and second axial bore holes have the same bore diameter, and wherein said top seal locations and said axial sealing interface have the same seal interface diameter.

28. The unified modular block of claim 27, wherein said first and second top bore holes and said first and second axial bore holes all have the same bore diameter, and wherein said top seal locations, said first axial sealing interface, and said second axial sealing interface all have the same seal interface diameter.

29. The unified modular block of claim 28, wherein said bore diameter is 0.18 inches and wherein said seal interface diameter is 0.29 inches.

30. The unified modular block of claim 29, wherein the total top-to-bottom depth of said second side is 0.63 inches.

31. The unified modular block of claim 30, wherein said mounting holes in said top surface are located at a 1.188 inch center-to-center spacing, and wherein said pair of first axial fastener locations and said pair of second axial fastener locations are located at a 0.62 inch center-to-center spacing respectively.

32. The unified modular block of claim 30, wherein said top surface of said unified modular block comprises a length and a width of at most 1.547 inches.

33. The unified modular block of claim 30, wherein said mounting holes in said top surface have depths of 0.30 to 0.33 inches.

34. The unified modular block of claim 32, wherein said second direction is perpendicular to said first direction.

35. The unified modular block of claim 32, wherein said unified modular block is configured to couple said first chemical flow path to said second chemical flow path without use of intermediate fasteners or seals.

36. The unified modular block of claim 19, wherein said unified modular block comprises stainless steel.

37. The unified modular block of claim 19, further comprising a top surface configured to have a chemical control component mounted thereon, and wherein said first and second sides are adjacent to each other at a first corner and transverse to said top surface.

38. The unified modular block of claim 19, wherein said unified modular block is a single, contiguous modular block.

39. The unified modular block of claim 19, wherein said each unified modular block further comprises:
   a third side opposite said first side;
   a fourth side opposite said second side;
   four corners arranged at intersections between said first, second, third, and fourth sides;
   a top surface extending at least partially between said first, second, third, and fourth sides; and
   four mounting holes in said top surface for mounting a chemical delivery control component, wherein one of said four mounting holes is arranged adjacent to each of said four corners, and wherein said first and second axial fastener locations are both arranged within the lateral boundaries of said four mounting holes.

40. The unified modular block of claim 19, further comprising:
   a third side opposite said first side, said third side comprising an exterior surface and an interior surface; and
   a third axial fastener location arranged in said third side for mating said unified modular block to a laterally adjacent modular block, wherein said unified modular block is configured to be fastened to a laterally adjacent modular block along said first axis by a fastener inserted into said third axial fastener location from an interior of said unified modular block.

41. A unified modular block providing multi-directional flow chemical delivery, said unified modular block comprising:

a top surface adapted for mounting a chemical control component thereon, said unified modular block comprising mounting holes in said top surface configured to receive fasteners for mounting the chemical delivery control component;

a first axial interface flange comprising a first exterior surface and a first interior surface;

a first chemical flow path within said unified modular block and comprising a first axial bore hole in said first exterior surface and a first top bore hole in said top surface, wherein said first axial interface flange is arranged adjacent to and around a portion of said first chemical flow path, and wherein said first chemical flow path extends from said first exterior surface of said unified modular block in a first direction along a first axis and is configured to provide chemical delivery in said first direction;

a pair of first axial fastener locations arranged in said first axial interface flange on opposite sides of said first axial borehole and configured to receive local side-to-side fasteners oriented in the direction of said first axis for coupling said unified modular block to a laterally adjacent modular block along said first axis, wherein each of said pair of first axial fastener locations comprises a first exterior opening and a first interior opening defined in said first exterior and interior surfaces, respectively, and wherein said unified modular block is configured to be fastened to a laterally adjacent modular block along said first axis by a fastener inserted into a first interior opening of at least one of said pair of first axial fastener locations, and wherein a distance between one of said pair of first axial fastener locations and another of said pair of first axial fastener locations is less than a distance between any one of said mounting holes and any other of said mounting holes;

a second axial interface flange comprising a second exterior surface and a second interior surface;

a second chemical flow path within said unified modular block and comprising a second axial bore hole in said second exterior surface and a second top bore hole in said top surface, wherein said second axial interface flange is arranged adjacent to and around a portion of said second chemical flow path, and wherein said second chemical flow path extends from second exterior surface of said unified modular block in a second direction along a second axis horizontally transverse to said first axis and is configured to provide chemical delivery in said second direction along said second axis, and wherein said first and second axes are parallel to said top surface and wherein said first chemical flow path is located above said second chemical flow path within said unified modular block; and a pair of second axial fastener locations arranged in said second axial interface flange on opposite sides of said second axial borehole and configured to receive local side-to-side fasteners oriented in the direction of said second axis for coupling said unified modular block to a laterally adjacent modular block along said second axis.

42. The unified modular block of claim 41, further comprising:

a third axial interface flange opposite said first axial interface flange;

a fourth axial interface flange opposite said second axial interface flange;

four corners arranged at intersections between said first, second, third, and fourth sides; and four mounting holes in said top surface of said top surface for mounting a chemical delivery control component, wherein one of said four mounting holes is arranged adjacent to each of said four corners.

43. The unified modular block of claim 42, wherein said four mounting holes of said unified modular block are approximately equidistant from each other.

44. The unified modular block of claim 42, and wherein said pair of first axial fastener locations and said pair of second axial fastener locations are both arranged within the lateral boundaries of said four mounting holes.

45. The unified modular block of claim 41, wherein a length and width of said unified modular block are approximately equal.

46. The unified modular block of claim 41, wherein said first and second axes are both parallel to said top surface.

47. The unified modular block of claim 41, wherein each of said pair of second axial fastener locations comprises a second exterior opening and a second interior opening defined in said second exterior and interior surfaces, respectively, and wherein said unified modular block is configured to be fastened to a laterally adjacent modular block along said second axis by a fastener inserted into a second interior opening of at least one of said pair of second axial fastener locations.

48. The unified modular block of claim 47, wherein said unified modular block is configured to be fastened to a laterally adjacent modular block along said first axis by a fastener inserted into both first interior openings of said pair of first axial fastener locations.

49. The unified modular block of claim 41, further comprising a first flow path wall extending from said first axial interface flange and surrounding a portion of said first chemical flow path, wherein a width of said first flow path wall is less than a width of said first axial interface flange such that a void is defined adjacent said first axial interface flange and said first fluid flow path wall.

50. The unified modular block of claim 41, further comprising:

a third axial interface flange opposite said first axial interface flange, said third axial interface flange comprising an exterior surface and an interior surface;

a third chemical flow path within said unified modular block and comprising a third axial bore hole in said third exterior surface and a third top bore hole in said top surface, wherein said third axial interface flange is arranged adjacent to and around a portion of said third chemical flow path, and wherein said third chemical flow path extends from said third exterior surface of said unified modular block along said first axis and is configured to provide chemical delivery along said first axis; and a pair of third axial fastener locations arranged in said third axial interface flange on opposite sides of a third axial borehole and configured to receive local side-to-side fasteners oriented in the direction of said first axis for coupling said unified modular block to a laterally adjacent modular block along said first axis, wherein each of said pair of third axial fastener locations comprises a third exterior opening and a third interior opening defined in said third exterior and third interior surfaces, respectively, and wherein said unified modular block is configured to be fastened to a laterally adjacent modular block along said first axis by a fastener inserted into a third interior opening of at least one of said pair of third axial fastener locations.

* * * * *

UNITED STATES PATENT AND TRADEMARK OFFICE
CERTIFICATE OF CORRECTION

PATENT NO. : 6,085,783

DATED : July 11, 2000

INVENTOR(S) : J. Gregory HOllingshead

It is certified that error appears in the above-indentified patent and that said Letters Patent is hereby corrected as shown below:

In the Claims:

Claim 7, col. 7, line 51, please delete "where in", and insert --wherein-- in place thereof.

Claim 22, col. 9, line 10, please delete "fir st", and insert --first-- in place thereof.

Claim 24, col. 9, line 19, please delete "bore hole", and insert --borehole-- in place thereof.

Claim 39, col. 10, line 55, please delete "comers", and insert --corners-- in place thereof.

Signed and Sealed this

Third Day of April, 2001

Attest:

NICHOLAS P. GODICI

Attesting Officer

Acting Director of the United States Patent and Trademark Office